(12) United States Patent
Kim et al.

(10) Patent No.: US 8,846,237 B2
(45) Date of Patent: Sep. 30, 2014

(54) ELECTRODE ASSEMBLY AND SECONDARY BATTERY HAVING THE SAME

(75) Inventors: Jong-Ku Kim, Suwon-si (KR); Yoo-Eup Hyung, Suwon-si (KR)

(73) Assignee: Samsung SDI Co. Ltd., Yongin-si (KR)

( * ) Notice: Subject to any disclaimer, the term of this patent is extended or adjusted under 35 U.S.C. 154(b) by 123 days.

(21) Appl. No.: 12/166,835

(22) Filed: Jul. 2, 2008

(65) Prior Publication Data

US 2009/0111011 A1 Apr. 30, 2009

(30) Foreign Application Priority Data

Oct. 30, 2007 (KR) ........................ 10-2007-0109576

(51) Int. Cl.
*H01M 2/18* (2006.01)
*H01M 2/14* (2006.01)
*H01M 2/16* (2006.01)
*H01M 4/76* (2006.01)

(52) U.S. Cl.
CPC .............. *H01M 2/168* (2013.01); *H01M 4/765* (2013.01)
USPC ........... 429/137; 429/129; 429/130; 429/132; 429/133

(58) Field of Classification Search
CPC ..... Y02E 60/122; H01M 2/168; H01M 4/765
USPC .......................... 429/129, 130, 132, 133, 137
See application file for complete search history.

(56) References Cited

U.S. PATENT DOCUMENTS

| | | | |
|---|---|---|---|
| 3,208,881 A | 9/1965 | Fallon | |
| 4,113,927 A | 9/1978 | Johnson et al. | |
| 5,521,028 A | 5/1996 | Gauthier et al. | |
| 6,387,564 B1 * | 5/2002 | Yamashita et al. | 429/132 |
| 2002/0182490 A1 * | 12/2002 | Cho et al. | 429/144 |
| 2009/0317713 A1 * | 12/2009 | Kim et al. | 429/164 |

FOREIGN PATENT DOCUMENTS

| | | |
|---|---|---|
| JP | 60-065450 | 4/1985 |
| JP | 10-241737 | 9/1998 |
| JP | 2001-128106 | 5/2001 |
| JP | 2002-42881 | 2/2002 |
| JP | 2004-259625 | 9/2004 |
| JP | 2005-235414 | 9/2005 |
| JP | 2005-285691 | 10/2005 |
| JP | 2006-128106 | 5/2006 |
| JP | 2006-134760 | 5/2006 |
| JP | 2006-147392 | 6/2006 |
| JP | 2007-066744 | 3/2007 |
| KR | 10-2004-0076831 | 9/2004 |
| KR | 10-2004-0107926 | 12/2004 |
| KR | 2006-37848 | 5/2006 |
| KR | 10-0709863 | 4/2007 |
| KR | 10-2007-0096882 | 10/2007 |

OTHER PUBLICATIONS

JP 10-241737—Translation.*
Communication issued by the European Patent Office on Mar. 3, 2009.
KIPO Office action dated Jun. 28, 2010, for priority Korean Patent application 10-2007-0109576.
KIPO Notice of Allowance dated Jan. 31, 2011, for Korean priority Patent application 10-2007-0109576, as well as KR 10-2004-0076831, previously filed in an IDS dated Sep. 16, 2010.
Japanese Office action dated Sep. 6, 2011, for corresponding Japanese Patent application 2008-180579, 3 pages.
Patent Abstracts of Japan, and English machine translation of Japanese Publication 2001-128106, 30 pages.
Patent Abstracts of Japan, and English machine translation of Japanese Publication 2002-042881, 35 pages.
Patent Abstracts of Japan, and English machine translation of Japanese Publication 2006-134760, 31 pages.
Japanese Office action dated Aug. 14, 2012, for corresponding Japanese Patent application 2008-180579, (3 pages).
Patent Abstracts of Japan, and English machine translation of Japanese Publication 2006-147392, (15 pages).
Patent Abstracts of Japan, and English machine translation of Japanese Publication 2007-066744, (34 pages).

* cited by examiner

*Primary Examiner* — Ladan Mohaddes
(74) *Attorney, Agent, or Firm* — Christie, Parker & Hale, LLP

(57) ABSTRACT

An electrode assembly and a secondary battery having the same improve efficiency and stability of the secondary battery. The electrode assembly includes: a positive electrode plate having a positive electrode collector on which a positive electrode coating portion and a positive electrode non-coating portion are formed; a negative electrode plate having a negative electrode collector on which a negative electrode coating portion and a negative electrode non-coating portion are formed; a separator disposed between the positive electrode plate and the negative electrode plate; and an insulating member disposed on one side of the positive or negative electrode non-coating portion, and formed adjacent to at least one of the ends of the positive electrode coating portion and/or at least one of the end of the negative electrode coating portion. The electrode assembly at least prevents damage to a separator generated due to non-uniformity of the ends of the electrode coating portion.

11 Claims, 4 Drawing Sheets

ELECTRODE ASSEMBLY AND SECONDARY BATTERY HAVING THE SAME

CROSS-REFERENCE TO RELATED APPLICATIONS

This application claims the benefit of Korean Patent Application No. 2007-0109576, filed Oct. 30, 2007, the disclosure of which is hereby incorporated herein by reference.

BACKGROUND OF THE INVENTION

1. Field of the Invention

Aspects of the present invention relate to an electrode assembly and a secondary battery having the same, and more particularly, to an electrode assembly and a secondary battery having the same, which improves efficiency and stability thereof.

2. Description of the Related Art

In recent times, various compact and handheld electronic/electrical appliances, such as cellular phones, notebook computers, camcorders, and like devices, have been widely developed and produced. The handheld electronic/electrical appliances include a battery pack installed therein to operate as a driving power source without a separate power source. The built-in battery pack includes at least one battery to output a specific level of voltage for driving the handheld electronic/electrical appliances for a specific time.

A secondary battery is widely used because it is rechargeable and can be manufactured in a compact size and to have high capacity in consideration of practicality and economical efficiency. Among the secondary batteries, a lithium secondary battery is widely used due to an operating voltage (i.e., 3.6V) three times higher and a higher energy density per unit weight than a nickel-cadmium (Ni—Cd) battery and a nickel-metal hydride (Ni-MH) battery, which are widely being used in the handheld electronic/electrical appliances.

Among the lithium secondary batteries, a lithium ion secondary battery includes a bare cell formed by accommodating an electrode assembly having a positive electrode plate, a negative electrode plate, and a separator in a can formed of aluminum or aluminum alloy, sealing the can with a cap assembly, injecting an electrolyte into the can, and sealing the can. A lithium polymer secondary battery having a polymer separator may use a pouch instead of a can because the separator serves as an electrolyte or the separator is impregnated with an electrolytic element, and thus there is less or no leakage of the electrolyte.

An electrode plate is generally formed by applying slurry including an electrode active material on a surface of an electrode collector formed of metal foil. An electrode assembly may include strips of a positive electrode plate, a separator, and a negative electrode plate which are sequentially wound in a jelly-roll type.

An electrode collector has an electrode coating portion formed by applying a slurry long enough to form one electrode, and a non-coating portion, in which an electrode active material is not applied, to which an electrode tab is welded.

A transient phenomenon occurs, in which the slurry is agglomerated, so that a starting region from which the application of the slurry to the electrode collector starts is a little thicker than other regions of the electrode coating portion. Further, a tailing phenomenon occurs, and thus the slurry is applied less at an ending region where the application of the slurry to the electrode collector is terminated than other regions of the electrode coating portion.

The starting and ending regions of the electrode coating portion may damage the separator that electrically insulates the positive electrode plate from the negative electrode plate when pressure supplied in the process of winding the electrode assembly or external pressure is applied thereto. As an internal short circuit between the positive and negative electrode plates is generated at these regions due to the damaged separator, a battery production yield may be decreased and safety concerns may arise.

Accordingly, in the conventional art, insulating layers were formed at the starting and ending regions of the slurry application to prevent these problems. However, in a conventional electrode assembly, since an insulating layer partially covers an electrode coating portion, a reaction area of the electrode coating portion is decreased. Thus, the capacity of the battery is reduced as much as the decreased reaction area. Further, since an insulating layer is formed in the electrode coating portion, a diameter of an electrode assembly which is wound in a jelly-roll type becomes larger. Furthermore, by a reaction of each component at a bonding portion between an electrode coating portion and an insulating layer, dissimilar metals other than cobalt may be released.

SUMMARY OF THE INVENTION

Aspects of the present invention provide an electrode assembly and a secondary battery having the same, which can improve efficiency and stability thereof.

According to an aspect of the present invention, an electrode assembly includes: a positive electrode plate having a positive electrode collector on which a positive electrode coating portion and a positive electrode non-coating portion are formed; a negative electrode plate having a negative electrode collector on which a negative electrode coating portion and a negative electrode non-coating portion are formed; a separator disposed between the positive electrode plate and the negative electrode plate; and an insulating member disposed on one side of the positive or negative electrode non-coating portion, and formed adjacent to at least one of the ends of the positive electrode coating portion and/or at least one of the ends of the negative electrode coating portion.

According to an aspect of the present invention, the insulating member may be spaced 3.5 mm or less apart from the end of the positive electrode coating portion or the negative electrode coating portion.

According to an aspect of the present invention, the insulating member may include an adhesive layer and an insulating film adhered to one surface of the adhesive layer.

According to an aspect of the present invention, the adhesive layer may not contact the positive electrode coating portion or the negative electrode coating portion.

According to an aspect of the present invention, the positive electrode coating portion and the negative electrode coating portion may include a uniform region in which slurry for a positive or negative electrode is uniformly applied and a non-uniform region in which slurry for a positive or negative electrode is not uniformly applied.

According to an aspect of the present invention, the insulating film may cover the non-uniform region.

According to another aspect of the present invention, a secondary battery includes: an outer casing; and an electrode assembly accommodated in the outer casing. According to an aspect of the present invention, the electrode assembly includes: a positive electrode plate including a positive electrode collector on which a positive electrode coating portion and a positive electrode non-coating portion are formed; a negative electrode plate including a negative electrode collector on which a negative electrode coating portion and a negative electrode non-coating portion are formed; and an insulating member disposed at one side of the positive or negative electrode non-coating portion and formed adjacent to at least one of the ends of the positive electrode coating portion and/or at least one of the ends of the negative electrode coating portion.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
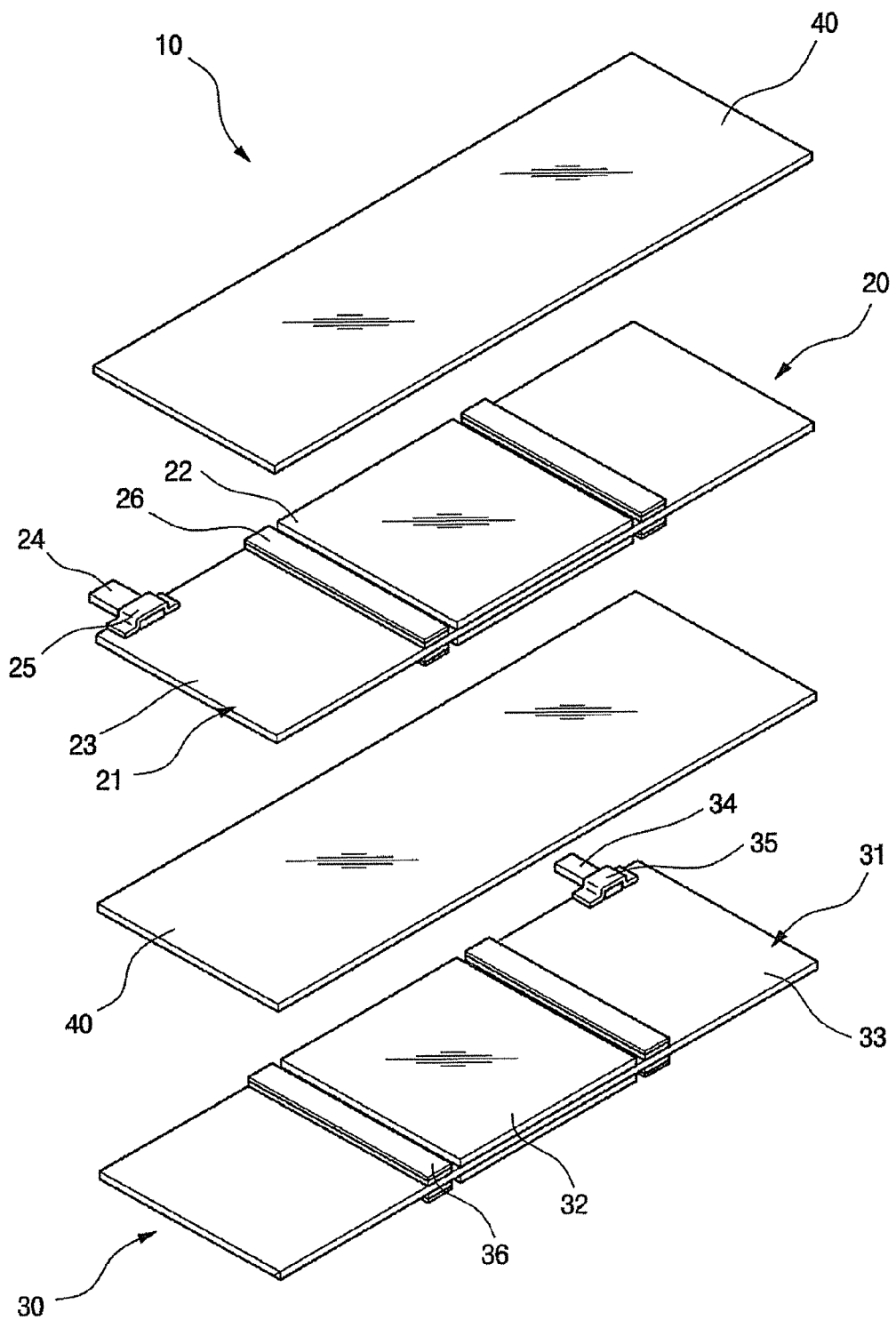
FIG. 1 is an exploded perspective view of an electrode assembly according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

FIG. 1 is an exploded perspective view of an electrode assembly according to an exemplary embodiment of the present invention. Referring to FIG. 1, an electrode assembly 10 includes a first electrode plate (hereinafter, referred to as a positive electrode plate) 20, a second electrode plate (hereinafter, referred to as a negative electrode plate) 30 and a separator 40.

The electrode assembly 10 includes the positive electrode plate 20, the negative electrode plate 30, and the separator 40, which are stacked and wound in a jelly-roll type electrode assembly. Although described as a jelly-role type electrode assembly, the electrode assembly 10 is not limited thereto. The separators 40 are disposed between the positive electrode plate 20 and the negative electrode plate 30 to prevent a short circuit between the electrode plates 20 and 30.

The positive electrode plate 20 includes a positive electrode collector 21 to collect electrons generated by a chemical reaction and to deliver them to an external circuit, and a positive electrode coating portion 22 in which slurry for a positive electrode including a positive electrode active material is applied to one surface or both surfaces of the positive electrode collector 21. Also, a positive electrode non-coating portion 23 is formed, in which the positive electrode collector 21 is exposed because the slurry for a positive electrode including the positive electrode active material is not applied to one surface or both surfaces at one or both ends of the positive electrode collector 21.

The positive electrode collector 21 may be formed of stainless steel, nickel, aluminum, titanium or an alloy thereof, or aluminum or stainless steel whose surface is treated with carbon, nickel titanium, or silver. Among them, aluminum or an aluminum alloy is preferred; however, aspects of the present invention do not limit the material of the positive electrode collector 21. The positive electrode collector 21 may be formed in a foil, film, sheet, punched, porous, or foam type, and the positive electrode collector 21 is generally formed to a thickness of 1 to 50 μm, and preferably 1 to 30 μm. However, aspects of the present invention do not limit the shape and thickness of the positive electrode collector 21.

The positive electrode coating portion 22 may be formed of a material in which a conductive material, such as carbon black or graphite powder, and a binder to bind an active material are mixed with a positive electrode active material. The positive electrode active material may be at least one of a complex oxide and lithium. The complex oxide may be at least one selected from cobalt oxide, manganese oxide, and nickel oxide, or a combination thereof. However, aspects of the present invention do not limit the material of the positive electrode active material. A positive electrode tab 24, which may be formed of a nickel or an aluminum foil to deliver electrons collected in the positive electrode collector 21 to the external circuit, is joined to the positive electrode non-coating portion 23.

A protection member 25 may be included on the junction between the positive electrode tab 24 and the positive electrode non-coating portion 23. The protection member 25 may be formed of a thermal-resistant polymer resin, such as polyester, to prevent a short circuit by protecting the junction. Moreover, the protection member 25 has sufficient width and length to completely surround the positive electrode tab 24 joined to the positive electrode non-coating portion 23.

The positive electrode plate 20 also includes an insulating member 26, which is adhered to the positive electrode non-coating portion 23 and formed adjacent to at least one of the ends of the positive electrode coating portion 22. The insulating member 26 may be formed of an insulating tape, and the insulating member 26 may include an adhesive layer and an insulating film adhered to one surface thereof. However, aspects of the present invention do not limit the shape and material of the insulating member 26. For example, the adhesive layer may be formed of an ethylene-acrylic ester copolymer, a rubber-based adhesive, or an ethylene-vinyl acetate copolymer; and, the insulating film may be formed of polypropylene, polyethylene terephthalate, or polyethylene naphthalate.

The negative electrode plate 30 includes a negative electrode collector 31 to collect electrons generated by a chemical reaction and to deliver them to an external circuit, and a negative electrode coating portion 32 in which slurry for a negative electrode including a negative electrode active material is applied to one surface or both surfaces of the negative electrode collector 31. Also, a negative electrode non-coating portion 33 is formed, in which the negative electrode collector 31 is exposed because the slurry for a negative electrode including the negative electrode active material is not applied to one surface or both surfaces of one or both ends of the negative electrode collector 31.

The negative electrode collector 31 may be formed of stainless steel, nickel, copper, titanium or an alloy thereof, or copper or stainless steel whose surface is treated with carbon, nickel, titanium, or silver. Among these, copper or a copper alloy is preferable. However, aspects of the present invention do not limit the material of the negative electrode collector 31. The negative electrode collector 31 may be formed in a foil, film, sheet, or punched, porous, or foam type, and it may be generally formed to a thickness of 1 to 50 µm, and preferably 1 to 30 µm. However, aspects of the present invention do not limit the shape and thickness of the negative electrode collector 31.

The negative electrode coating portion 32 may be formed of a material in which a conductive material such as carbon black and a binder to fix an active material, such as polyvinylidene fluoride (PVDF), styrene butadiene rubber (SBR), or polytetrafluoroethylene (PTFE), are mixed with a negative electrode active material. The negative electrode active material may be a carbon material, such as crystalline carbon, amorphous carbon, carbon complex or carbon fiber, or lithium metal or a lithium alloy; however, aspects of the present invention do not limit the material of the negative electrode active material. A negative electrode tab 34 formed of a nickel foil to deliver electrons collected in the negative electrode collector 31 to an external circuit is joined to the negative electrode non-coating portion 33 through a junction.

A protection member 35 may be disposed on the junction between the negative electrode tab 34 and the negative electrode non-coating portion 33. The protection member 35 may be formed of a thermal-resistant polymer resin, such as polyester, to prevent a short circuit by protecting the junction. Moreover, the protection member 35 has sufficient width and length to completely surround the negative electrode tab 34 joined to the negative electrode non-coating portion 33.

The negative electrode plate 30 also includes an insulating member 36 which is adhered to the negative electrode non-coating portion 33 and formed adjacent to at least one of the ends of the negative electrode coating portion 32. The insulating member 36 may be formed of an insulating tape, and the insulating member 36 may include an adhesive layer and an insulating film adhered to one surface thereof. However, aspects of the present invention do not limit the shape and material of the insulating member 36. For example, the adhesive layer may be formed of an ethylene-acrylic ester copolymer, a rubber-based adhesive, or an ethylene-vinyl acetate copolymer; and, the insulating film may be formed of polypropylene, polyethylene terephthalate, or polyethylene naphthalate.

The separator 40 is generally formed of a thermoplastic resin, such as polyethylene or polypropylene, and the surface of the separator 40 is generally porous. A through-hole in the porous surface, if present, closes when the separator 40 softens at a temperature near a melting point of the thermoplastic resin due to an increase in an inner temperature of the secondary battery. Thus, the separator 40 becomes an insulating film. Accordingly, migration of lithium ions between the positive electrode plate 20 and the negative electrode plate 30 is interrupted so that electric current does not flow from the positive electrode plate 20 to the negative electrode plate 30; thus, the inner temperature of the secondary battery stops increasing.

Further, the insulating members 26 and 36 may be formed adjacent to at least one of the ends of the positive electrode coating portion 22 and/or at least one of the ends of the negative electrode coating portion 32, i.e., the insulating member 26 may be formed at one or both of the ends of one or each positive electrode coating portion 22 and/or the insulating member 36 may be formed at one or both of the ends of one or each negative electrode coating portion 32.

Figure 2A:
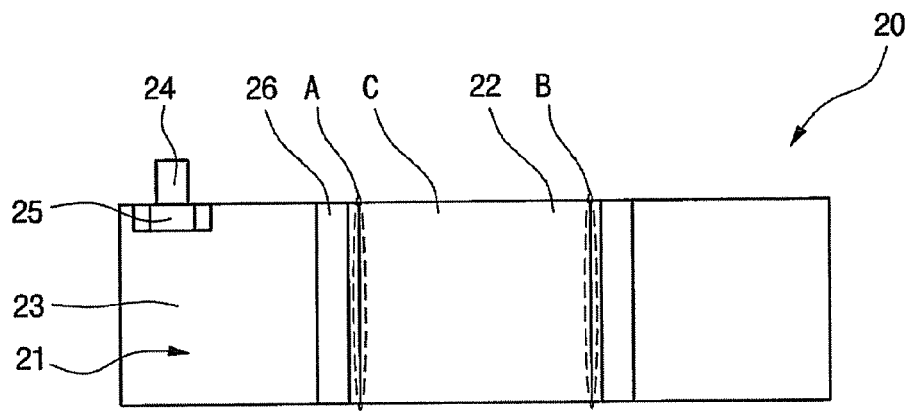
FIGS. 2A and 2B are plan and front views of an electrode plate according to an exemplary embodiment of the present invention, respectively.
Figure 2B:
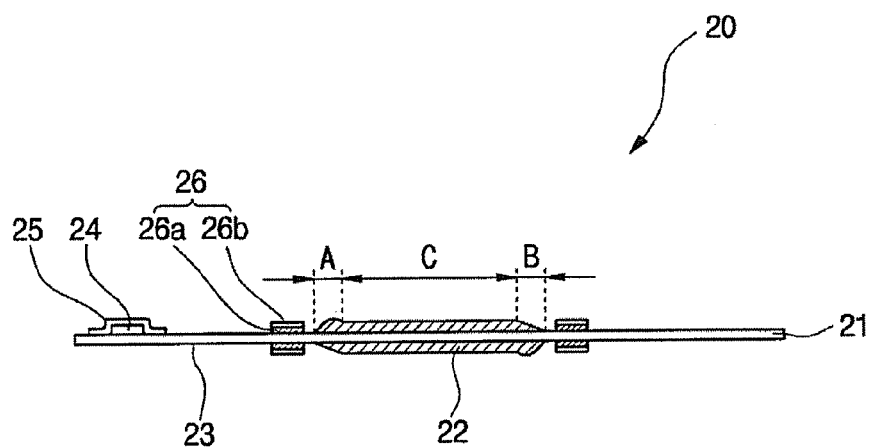
Figure 2C:
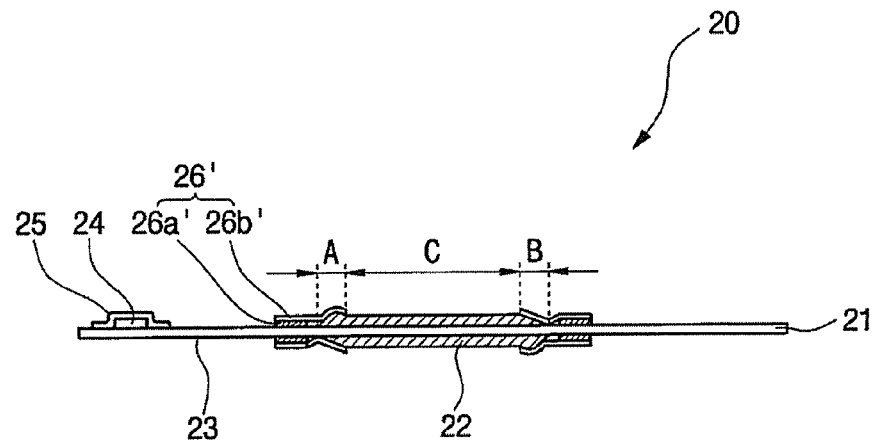
FIG. 2C is a front view of an electrode plate according to an exemplary embodiment of the present invention.

FIGS. 2A and 2B are plan and front views of an electrode plate according to an exemplary embodiment of the present invention, and FIG. 2C is a front view of an electrode plate according to an exemplary embodiment of the present invention. While an electrode plate, for example, a positive electrode plate 20, will now be described with reference to FIGS. 2A and 2C, a detailed description of a negative electrode plate 30 is generally the same as that of the positive electrode plate 20, and thus such description will be omitted.

As illustrated in FIGS. 2A to 2C, a coating portion 22 formed on one surface of a positive electrode collector 21 may be divided into non-uniform regions A and B, formed at the ends of the coating portion 22, and a uniform region C, formed between the non-uniform regions A and B. That is, in a starting part in which an application of slurry to the positive electrode collector 21 starts, the region A is formed slightly thicker than the region C in which a positive electrode coating portion is uniformly formed because of accumulation of the slurry. Also, in an ending part where the application of the slurry to the positive electrode collector 21 is terminated, the region B is formed, in which the slurry is applied slightly thinner than the region C in which a positive electrode coating portion is uniformly formed due to a tailing phenomenon. That is, the starting part of the positive electrode coating portion is thicker than the uniform region C, and the ending part of the positive electrode coating portion is thinner than the uniform region C.

The positive electrode plate 20 includes an insulating member 26 adhered to a positive electrode non-coating portion 23, adjacent to at least one of the ends of the positive electrode coating portion 22, and formed in a stripe type to be generally parallel to the end part of the positive electrode coating portion 22. The insulating member 26 may be formed of an insulating tape, which includes an adhesive layer 26a and an insulating film 26b adhered to one surface thereof. However, aspects of the present invention do not limit the shape and material of the insulating member 26. For example, the adhesive layer may be formed of an ethylene-acrylic ester copolymer, a rubber-based adhesive, or an ethylene-vinyl acetate copolymer; and, the insulating film may be formed of polypropylene, polyethylene terephthalate, or polyethylene naphthalate. If the distance between the insulating member 26 and the positive electrode coating portion 22 is too great, the non-uniform regions A and B may damage the separator 40 (of FIG. 1) in formation of the electrode assembly 10 (of FIG. 1), and thus an internal short circuit may occur. Therefore, the distance between the insulating member 26 and the end part of the positive electrode coating portion 22 may be the same as a width of the non-uniform regions A and B, or less. Also, if the distance between the insulating member 26 and the end part of the positive electrode coating portion 22 is greater than 3.5 mm, damage to the separator 40 and internal short circuit are more likely. Accordingly, the insulating member 26 may be formed to be spaced 3.5 mm or less apart from the end part of the positive electrode coating portion 22.

The insulating member 26 may be formed adjacent to at least one of the ends of the electrode coating portion 22, i.e., the insulating member 26 may be formed at one or both of the ends of the coating portion 22 on one or both sides of the positive electrode collector 21.

The thickness of the insulating member 26 is about 24 µm or more, so that the insulating member 26 can prevent damage from the non-uniform regions A and B and be capable of insulating. Also, if the insulating member 26 is thicker than the positive electrode coating portion 22, the thickness of the electrode assembly may increase. Consequently, the thickness of the insulating member 26 may be equal to or less than the thickness of the positive electrode coating portion 22. Further, the insulating member 26 has the same thickness as the positive electrode coating portion 22 and may have the same thickness as a protrusion of the region A at the adjoining part with the protrusion formed by accumulation of the slurry. Furthermore, the insulating member 26, as illustrated in FIG. 2B, may be formed not to overlap the positive electrode coating portion 22, or an insulating film 26b' of the insulating member 26 may cover the non-uniform region of the positive electrode coating portion 22 as illustrated in FIG. 2C. Consequently, since adhesive layers 26a and 26a' do not overlap the positive electrode coating portion 22, release of metals other than cobalt, which is caused by reaction of each component at the adjoining part between the electrode coating portion 22 and the adhesive layers 26a and 26a', may be prevented.

Figure 3:
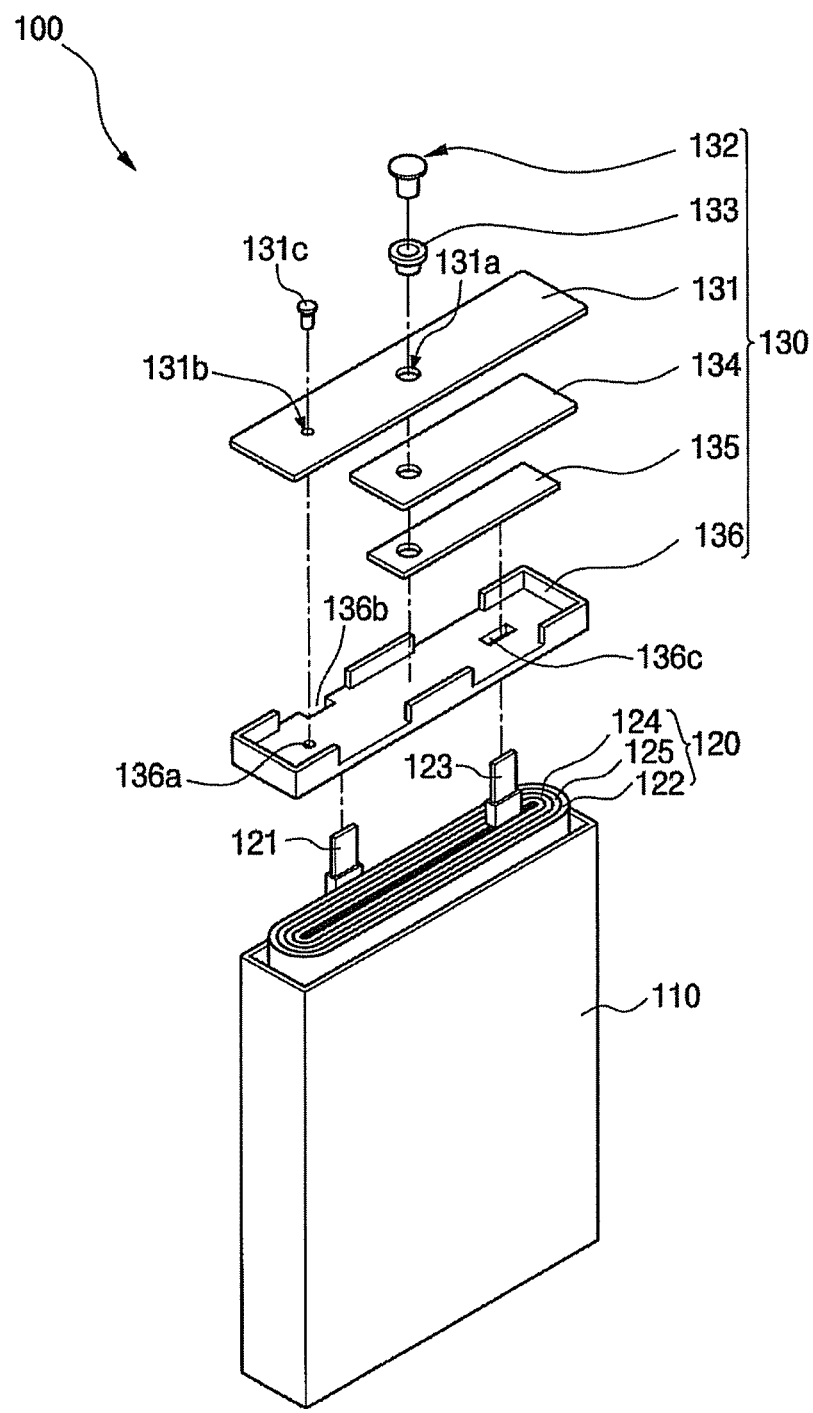
FIG. 3 is a perspective view of a secondary battery including an electrode assembly according to an exemplary embodiment of the present invention.
Figure 4:
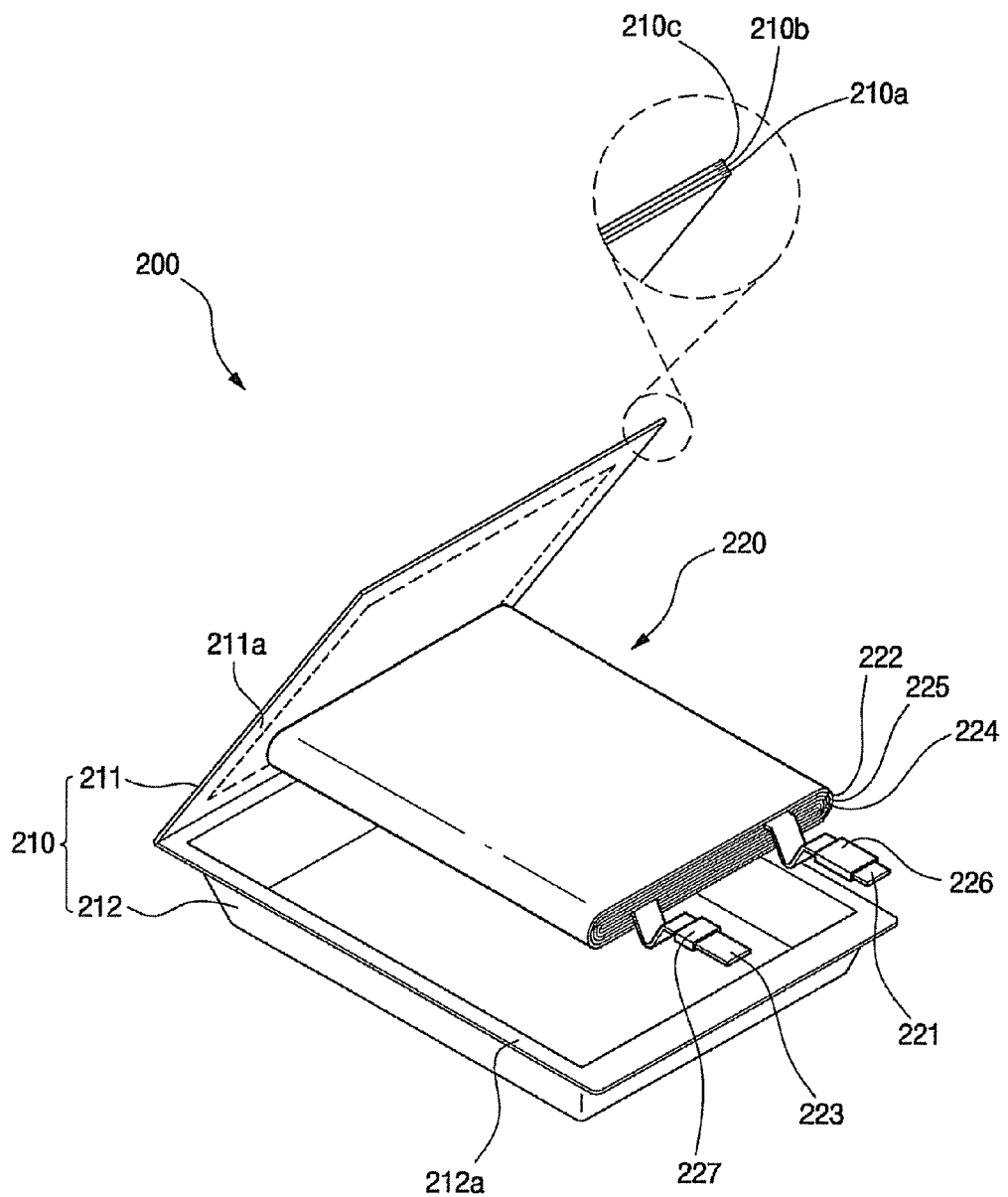
FIG. 4 is a perspective view of a secondary battery including an electrode assembly according to an exemplary embodiment of the present invention.

FIGS. 3 and 4 are exploded perspective views of a second battery including an electrode assembly according to an exemplary embodiment of the present invention. Referring to FIG. 3, a secondary battery 100 includes an outer casing 110, an electrode assembly 120 which is formed in a jelly-roll type and housed in the outer casing 110, and a cap assembly 130 connected to one end of the outer casing 110. The outer casing 110 may be formed of a metallic material having an opening at one end and may be a terminal. The outer casing 110 may be formed by deep-drawing steel or aluminum and may have a cylinder shape, a prismatic shape, or a pillar shape having rounded corners.

The electrode assembly 120 includes a first electrode plate 122 connected with a first electrode tab 121, a second electrode plate 124 connected with a second electrode tab 123, and a separator 125, which are wound. The separator 125 is disposed between the first and second electrode plates 122 and 124 to insulate the first and second electrode plates 122 and 124 from each other. The first and second electrode plates 122 and 124 include an insulating member, which is similar as that described in FIGS. 1 to 2C, and thus the detailed description thereof will be omitted.

The cap assembly 130 includes a planar-shaped cap plate 131, which has a size and shape corresponding to the opening of the outer casing 110. In the cap plate 131, a terminal through-hole 131a and an electrolyte injection hole 131b through which the electrolyte is injected are formed, and the electrolyte injection hole 131b is sealed by a plug 131c for the electrolyte injection hole 131b.

An electrode terminal 132 is inserted through the terminal through-hole 131a, and a tube-type gasket 133 is disposed around the electrode terminal 132 to electrically insulate the electrode terminal 132 from the cap plate 131.

An insulting plate 134 is disposed under the cap plate 131, and a terminal plate 135 is disposed under the insulating plate 134. A first electrode tab 121, which is led from and electrically connected to the first electrode plate 122, is welded to the bottom surface of the cap plate 131. A second electrode tab 123, which is led from and electrically connected to the second electrode plate 124, is welded to the bottom surface of the terminal plate 135. Moreover, an insulating case 136 is disposed on the electrode assembly 120 accommodated in the outer casing 110 so that the electrode assembly 120 is electrically insulated from the cap assembly 130.

The insulating case 136 has a through-hole 136a for injection of the electrolyte in a position corresponding to the electrolyte injection hole 131b formed in the cap plate 131. The insulating case 136 also has a groove 136b and a hole 136c are formed to guide the first and second electrode tabs 121 and 123 through the insulating case 136 while maintaining a predetermined distance between the first and second electrode tabs 121 and 123.

The secondary battery 100 formed as above may further include a printed circuit board on which a protection device is mounted to prevent safety concerns such as overcurrent, overdischarge, or overcharge. Also, to protect the exterior of the secondary battery 100, tubing or labeling may be further performed. Alternatively, a separate outer case may surround the secondary battery 100.

Referring to FIG. 4, a secondary battery 200 includes a pouch-type outer casing 210 including a top outer casing 211 and a bottom outer casing 212, and an electrode assembly 220 housed in the outer casing 210. The top and bottom outer casings 211 and 212 are joined to each other at one side, and the other sides are open to accommodate the electrode assembly 220. While, in one of the top or bottom outer casing 211 or 212, a space in which the electrode assembly 220 is housed may be formed; in FIG. 4, the space is formed in the lower outer casing 212. Top and bottom sealing parts 211a and 212a are formed to be sealed by a method such as thermal bonding about the periphery of the top and bottom outer casings 211 and 212.

The outer casing 210 may be formed in a multi-layered structure of a thermal bonding layer 210a having thermal bonding characteristics to serve as a sealant, a metal layer 210b formed of a metallic material to maintain mechanical strength and serve as a barrier to moisture and oxygen, and an insulating layer 210c.

The electrode assembly 220 may include a first electrode plate 222 connected to a first electrode tab 221, a second electrode plate 224 connected to a second electrode tab 223, and a separator 225 interposed between the both electrode plates 222 and 224, which are wound. The first and second electrode plates 222 and 224 have an insulating member, which is the same as that described in FIGS. 1 to 2C, and thus the detailed description of the insulating member will be omitted.

Adhesive tab tapes 226 and 227 may be further disposed on overlapping parts of the sealing parts 211a and 212a and the first and second electrode tabs 221 and 223 in order to seal the case.

The secondary battery 200 formed as above may further include a printed circuit board on which a protection device is mounted at one side to prevent safety concerns, for example, overcurrent, overdischarge, and overcharge. To protect an exterior of the secondary battery 200, tubing or labeling may be further applied. Alternatively, a separate outer case may surround the secondary battery 200.

According to aspects of the present invention, an electrode coating portion is not in contact with an adhesive layer, so that a decrease in reaction area of the coating portion may be prevented, and a battery capacity may be increased by as much as the decreased area. Since the electrode coating portion is not covered by an insulating member, the thickness of an electrode assembly may be decreased. Thus the diameter of the electrode assembly wound as a jelly-roll type may be decreased. Moreover, aspects of the present invention may prevent release of dissimilar metals other than cobalt from an adhering part between the electrode coating portion and the insulating layer. Furthermore, aspects of the present invention may prevent damage to a separator generated due to non-uniformity of the ends of the electrode coating portion, and aspects of the present invention may prevent a short circuit between two different electrode plates so as to improve stability.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly, comprising:
a positive electrode plate including
a positive electrode collector having a coated surface having a positive electrode coating portion and a positive electrode non-coating portion,
a positive electrode active material coated on the positive electrode coating portion,
a positive electrode tab on the positive electrode non-coating portion, and
a positive electrode insulating member on the positive electrode non-coating portion of the coated surface between and not in contact with both the positive electrode tab and the positive electrode active material, the positive electrode insulating member being formed adjacent to and not in contact with an end of the positive electrode active material;
a negative electrode plate; and
a separator between the positive electrode plate and the negative electrode plate.

2. The electrode assembly of claim 1,
wherein the positive electrode coating portion has a uniform region in which the positive electrode active material is uniformly coated and non-uniform regions in which the positive electrode active material is not uniformly coated, and
wherein a distance between the positive electrode insulating member and the end of the positive electrode active material is a same as or less than a width of a nearest one of the non-uniform regions.

3. The electrode assembly of claim 2, wherein the distance is 3.5 millimeters (mm) or less.

4. An electrode assembly comprising:
a positive electrode plate including
a positive electrode collector having a positive electrode coating portion and a positive electrode non-coating portion, and
a positive electrode active material coated on the positive electrode coating portion of the positive electrode collector;
a negative electrode plate including
a negative electrode collector having a negative electrode coating portion and a negative electrode non-coating portion, and
a negative electrode active material coated on the negative electrode coating portion of the negative electrode collector;
a separator disposed between the positive electrode plate and the negative electrode plate;
a positive electrode insulating member disposed on the positive electrode non-coating portion of the positive electrode collector, and formed adjacent to an end of the positive electrode active material; and
a negative electrode insulating member disposed on the negative electrode non-coating portion of the negative electrode collector, and formed adjacent to an end of the negative electrode active material,
wherein each of the positive electrode coating portion and the negative electrode coating portion comprises
a uniform region in which the positive electrode active material or the negative electrode active material is uniformly coated, and
a non-uniform region in which the positive electrode active material or the negative electrode active material is not uniformly coated,
wherein the positive electrode insulating member comprises
an adhesive layer adhering to the positive electrode collector and not in contact with the positive electrode active material, and
an insulating film adhering to the adhesive layer opposite the positive electrode collector, and covering and in contact with the non-uniform region of the positive electrode coating portion, and
wherein the negative electrode insulating member comprises
an adhesive layer adhering to the negative electrode collector and not in contact with the negative electrode active material, and
an insulating film adhering to the adhesive layer opposite the negative electrode collector, and covering and in contact with the non-uniform region of the negative electrode coating portion.

5. The electrode assembly of claim 2, wherein each of the non-uniform regions comprises a starting part in which a coating of the positive electrode active material starts or an ending part in which the coating of the electrode active material terminates.

6. The electrode assembly of claim 5, wherein
the starting part is thicker than the uniform region, and
the ending part is thinner than the uniform region.

7. The electrode assembly of claim 5, wherein a thickness of the positive electrode insulating member adjacent to the starting part is a same as that of the starting part.

8. The electrode assembly of claim 4, wherein each of the non-uniform regions comprises
a starting part in which the coating of the positive electrode active material or the negative electrode active material starts, or
an ending part in which the coating of the positive electrode active material or the negative electrode active material is terminated.

9. The electrode assembly of claim 8, wherein
the starting part is thicker than a corresponding one of the uniform regions, and
the ending part is thinner than the corresponding one of the uniform regions.

10. The electrode assembly of claim 8, wherein a thickness of one of the positive electrode insulating member or the negative electrode insulating member adjacent to the starting part is a same as that of the starting part.

11. The electrode assembly of claim 1, wherein the positive electrode insulating member comprises an adhesive layer on the positive electrode non-coating portion and an insulating film adhered to the adhesive layer, the adhesive layer being between the positive electrode non-coating portion and the insulating film.

* * * * *